United States Patent
Ma

(10) Patent No.: US 8,625,895 B2
(45) Date of Patent: Jan. 7, 2014

(54) TABLE GRID DETECTION AND SEPARATION

(75) Inventor: Huanfeng Ma, Drexel Hill, PA (US)

(73) Assignee: The Neat Company, Inc., Philadelphia, PA (US)

( * ) Notice: Subject to any disclaimer, the term of this patent is extended or adjusted under 35 U.S.C. 154(b) by 1318 days.

(21) Appl. No.: 12/414,365

(22) Filed: Mar. 30, 2009

(65) Prior Publication Data

US 2010/0246958 A1   Sep. 30, 2010

(51) Int. Cl.
 *G06K 9/34* (2006.01)
(52) U.S. Cl.
 USPC ......................................... 382/173; 382/195
(58) Field of Classification Search
 USPC ......... 382/173, 176, 190, 195, 203, 204, 245, 382/257, 258, 286
 See application file for complete search history.

(56) References Cited

U.S. PATENT DOCUMENTS

| | | | |
|---|---|---|---|
| 5,923,782 A * | 7/1999 | Chhabra et al. | 382/202 |
| 6,360,006 B1 * | 3/2002 | Wang | 382/162 |
| 6,711,292 B2 * | 3/2004 | Wang | 382/199 |
| 7,069,240 B2 | 6/2006 | Spero et al. | |

* cited by examiner

*Primary Examiner* — Phuoc Tran
(74) *Attorney, Agent, or Firm* — Woodcock Washburn LLP

(57) ABSTRACT

A technique is described for table grid detection and separation during the analysis and recognition of documents containing table contents. The technique includes the steps of table detection, grid separation, and table cell extraction. The technique is characterized by the steps of detecting the grid lines of a table using, for example, inverse cell detection, separating noise and touching text from the grid lines, and extracting the cell contents for OCR recognition.

51 Claims, 18 Drawing Sheets

TABLE GRID DETECTION AND SEPARATION

TECHNICAL FIELD

The invention relates to analyzing and recognizing the content of scanned documents and, more particularly, to techniques for analyzing and recognizing the contents of tables within scanned documents.

BACKGROUND OF THE INVENTION

Reading table content plays a very important role in parsing documents that contain table contents. Such documents can be invoices, bills, shipping receipts, medical or insurance claim forms, financial spread sheets, and the like. Considering the large variations of table designs on these documents, providing a correct reading order that helps the parsing of document content is a challenging task. Reading tables from document images, especially when the images have skewing or handwriting, is even more challenging. The technique described herein addresses these issues by providing a methodology for detecting and separating table grids from scanned document images.

SUMMARY OF THE INVENTION

A technique is provided for scanning invoice images and other documents with tables in order to detect tables and their contents, extract inverse and regular table cells, separate noise, graphics or handwriting from the table grid, and separate touching texts from the table grid. Although the techniques described herein were initially designed for processing invoice document images in an exemplary embodiment, those skilled in the art will appreciate that the techniques described herein may be readily applied to extract the contents of other types of tables of other types of documents as desired.

In particular, the invention encompasses methods, systems, and computer readable media storing instructions for implementing on a processor a method for detecting a table grid in a received digital document and extracting the table grid from the received digital document. In an exemplary embodiment, the technique includes extracting connected components from the received digital document to identify table grid candidates, extracting inverse cells from the table grid candidates, extracting grid line components from the table grid candidates, validating that the grid line components belong to a table grid, and extracting regular cells from the validated grid line components. An exemplary embodiment of the method also includes separating noise, graphics, handwriting, and/or touching text from the validated grid line components.

In an exemplary embodiment, extracting inverse cells from the table grid candidates comprises generating a binary image from connected components by assigning white background and assigning all pixels in the connected components a black value, and applying a smearing operation to the generated binary image in both the horizontal and vertical directions. White holes in the connected components that are smaller than a predetermined size also may be filled with black pixels, and horizontal and vertical short runs having lengths less than a predetermined threshold may be removed by setting pixels in the short runs to white color. Extracting inverse cells from the table grid candidates may also include removing all black connected components in the binary image and validating whether each connected component may be an inverse cell. The validation includes, for each extracted component with perimeter S, width $w_c$, height $h_c$ and pixel number $N_p$, calculating the rectangularity degree $D_{rect}$ of this connected component as follows:

$$D_{rect} = \min\left(\frac{N_p}{w_c \cdot h_c}, \frac{N_p}{\frac{S - 2\min(w_c, h_c)}{2} \cdot \min(w_c, h_c)}\right),$$

and determining that the connected component is a valid inverse cell component if the rectangularity degree $D_{rect}$ is larger than a predefined threshold. Validating whether each connected component may be an inverse cell also includes computing the variance $V_r$ of the lengths of all runs in the connected component as follows:

$$V_r = \begin{cases} \text{var(lengths of all horizontal runs)} & \text{if } w_c < h_c \\ \text{var(lengths of all vertical runs)} & \text{Otherwise} \end{cases}$$

where var(.) is an operator to compute the variance of an integer sequence, and determining that a connected component is an inverse cell component if $V_r$ is less than a threshold.

In exemplary embodiments, extracting grid line components from the table grid candidates includes determining that any horizontal run or vertical run of pixels in the connected components not smaller than a threshold is part of a table grid.

On the other hand, validating the grid line components as belonging to a table grid may be done by determining whether the grid line components satisfy one or more of the following tests:

(1) determining whether the density D of a connected component is greater than a threshold, where D is the number of pixels in the connected component divided by the product of the width and height of the connected component, computing the ratio $R_t$ between the number of inverse cell component pixels and the number of the original connected component pixels, and determining that the grid line components belong to a table grid containing inverse cells if $R_t$ is greater than a second threshold;

(2) determining whether the density D of a connected component is less than a threshold, where D is the number of pixels in the connected component divided by the product of the width and height of the connected component, and determining that the grid line components belong to a table grid if D is less than the threshold;

(3) determining whether every line component of the grid line components is long enough and large enough to be part of a table grid based on the width and height of each connected component of the grid line components;

(4) checking the number of horizontal and vertical grid line components and when the number is greater than a predetermined number, identifying four margin lines that are two horizontal lines with minimum and maximum Y coordinates and two vertical lines with minimum and maximum X coordinates, and determining that the grid line components are part of a round-corner grid when (1) the sum of the lengths of the four margin lines $S_l$ is greater than or equal to a·S, where a is a value between 0 and 1 and S is the perimeter of an original table grid comprising a round-corner rectangle where S is defined as two times the width plus height of the connected components of the original table grid, and (2) the area $A_l$ of the table grid formed by the grid line components is greater than or equal to a·A, where A is the area of the original table grid defined as width times the height of the original table grid;

(5) identifying the two longest horizontal lines and two longest vertical lines of the grid line components with a length tolerance $T_t$, identifying two horizontal margins as the longest horizontal line with length $L_h$ from horizontal grid line components, getting all horizontal grid lines with length larger than $L_h-T_t$ and putting them in a group $G_h$, and from $G_h$, taking the line with the minimum Y coordinate as the top margin and the line with the maximum Y coordinate as the bottom margin, identifying two vertical margins as the longest vertical line with length $L_v$ from vertical grid line components, getting all vertical grid lines with length larger than $L_v-T_t$ and putting them in a group $G_v$ and from $G_v$, taking the line with the minimum X coordinate as the left margin and the line with the maximum X coordinate as the right margin, calculating the distance between the left and right margins, the distance between the top and bottom margins, the position difference between end points of the left and right margins, the position difference between end points of the top and bottom margins, the height difference between the left and right margins, and the width difference between the top and bottom margins, and validating the grid line components if each of the following tests is satisfied:

every pair of margins has the same length,
every pair of margins is at the same level,
there exists at least one thin margin,
the left and right margins are parallel,
the top and bottom margins are parallel, and
the table grid is large enough;

(6) determining that the table grid comprises an open table defined as a table grid with only top and bottom margins and one or multiple vertical separator lines by computing the distance between the top and bottom margins, the position difference between end points of the top and bottom margins, and the width difference between the top and bottom margins and validating the grid line components if each of the following tests is satisfied:

there exists at least one vertical separator line,
the top and bottom margins have the same length,
the top and bottom margins are at the same level,
both the top and bottom margins are thin margins,
the top and bottom margins are parallel, and
the table grid is large enough; and (7) validating a single-cell by generating a binary image from the original connected components, adding a black bounding box to the binary image, extracting all white holes from the image to get the hole with a maximum area $A_{max}$, and validating the grid line components if the hole with the maximum area has an area that is at least a predetermined percentage of the total area of the original connected components.

In exemplary embodiments of the invention, separating noise, graphics, handwriting, and/or touching text from validated grid line components comprises initializing the table grid by merging all inverse cell components into one single connected component, merging all horizontal and vertical black connected components that are connected with the table grid to the table grid to identify short grid lines shorter than a threshold and all remaining connected components that are not connected with an inverse cell component. The short grid lines and the connected components that are not connected with an inverse cell component may then be classified by, for each connected component C:

merging C to a final table grid $CC_F$ if C is a short line and connected with $CC_F$;

adding C to a group of all remaining black connected components if C is a short line but is not connected with $CC_F$;

adding C the group of all remaining black connected components if C is not a short line but connected to at least one component in the group of all remaining black connected components; and merging C to $CC_F$ if C is not a short line and not connected with any component in the group of all remaining black connected components.

Once so classified, the components in the group of all remaining black connected components may be classified into graphics, grid or text by:

determining that a connected component with one dimension larger than a maximum text size is graphics;

determining that a connected component with one dimension smaller than a minimum text size is a grid;

checking that a connected component with text size has one round corner component and, if so, merging the round corner component into a grid; and determining that components with text size that do not have round corner components are text.

BRIEF DESCRIPTION OF THE DRAWINGS

The foregoing summary, as well as the following detailed description of various embodiments of the present invention, will be better understood when read in conjunction with the appended drawings. For the purpose of illustrating the embodiments, there are shown in the drawings embodiments that are presently preferred. It should be understood, however, the embodiments of the present invention are not limited to the precise arrangements and instrumentalities shown.

FIG. 5 illustrates the pre-processing result of a connected component image, where (a) is the original binary image and (b) is the processed image.

Figure 13:
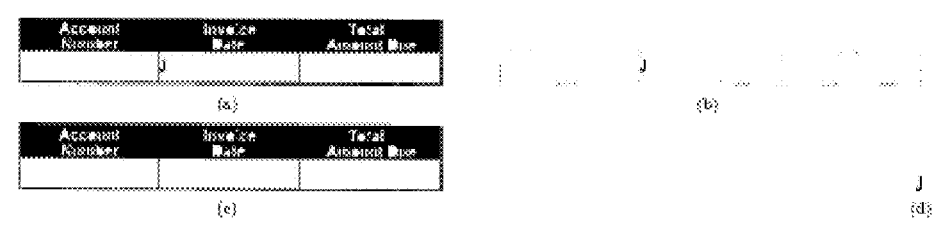

FIG. 13 illustrates an example showing the remaining components of a grid, where (a) is the original grid, (b) are all of the remaining components, (c) is the restored grid, and (d) is the separated touching text.

DETAILED DESCRIPTION OF ILLUSTRATIVE EMBODIMENTS

Exemplary embodiments of the invention will be described in detail below with reference to FIGS. 1-22. Those skilled in the art will appreciate that the description given herein with respect to those figures is for exemplary purposes only and is not intended in any way to limit the scope of the invention. All questions regarding the scope of the invention may be resolved by referring to the appended claims.

Exemplary System

Figure 1:
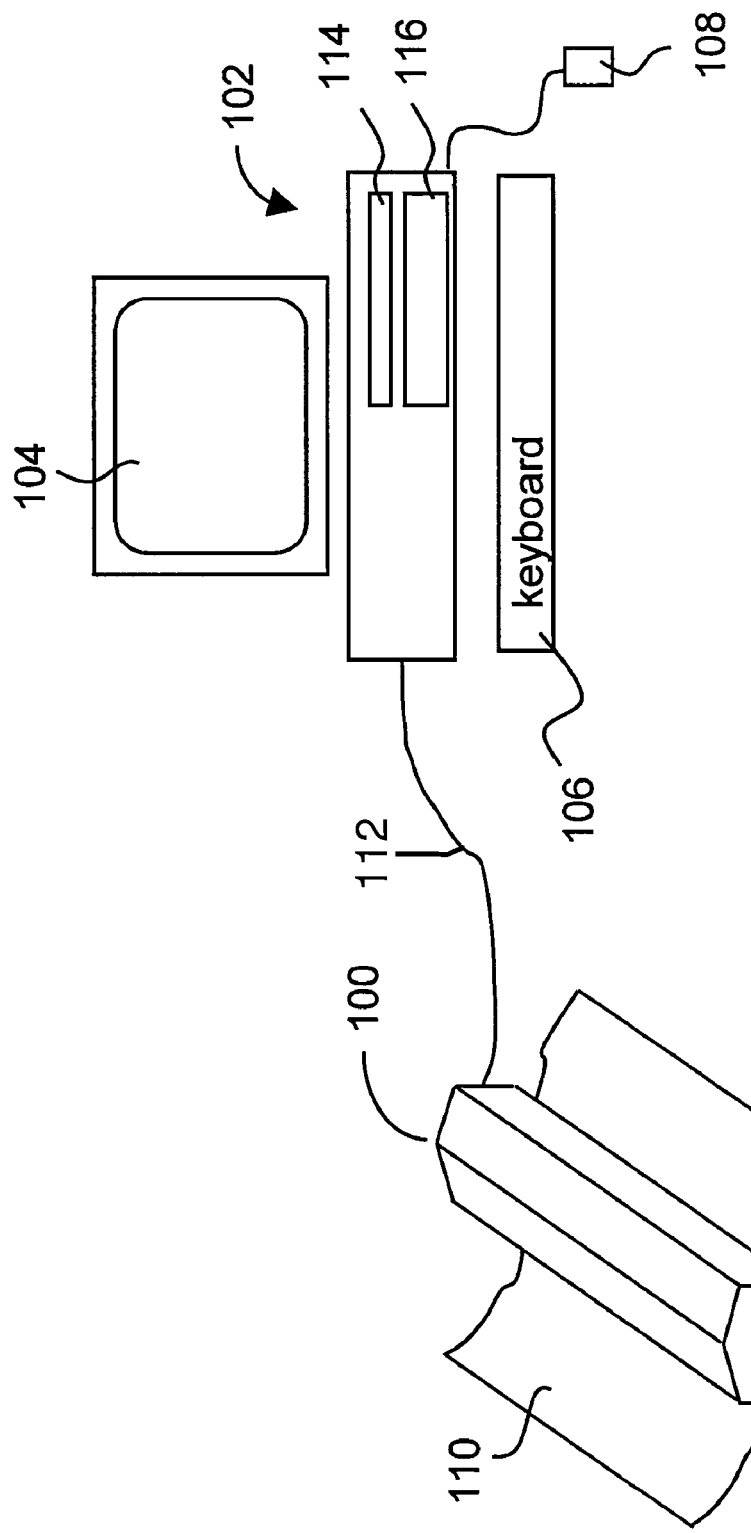
FIG. 1 illustrates a schematic diagram of a portable scanning system that may be adapted to scan documents for table grid detection and separation using the techniques of the invention.

FIG. 1 illustrates a schematic diagram of a portable scanning system that may be adapted to scan documents for table grid detection and separation using the techniques of the invention. Of course, the techniques described herein may also be used with conventional, non-portable scanning systems as well. As illustrated in FIG. 1, sheet-fed scanner 100 is connected through communication cable 112 to a computing device 102, which may be a desktop or laptop computer, for example. Scanner 100 scans a sheet 110, which may be a sheet of paper, a receipt, a business card, or the like, and digitizes the text and graphics thereon in a conventional manner. The scanning result is generally a digital image that is transferred to the computing device 102 through communications cable 112. The digital image may then be manipulated by a computer program executed by computing device 102. The computer program as executed by computing device 102 may implement various aspects of the claimed method as explained below. Thus, the computing device 102 is a machine that implements the method described herein.

The computing device 102 includes a display monitor 104 on which the scanned image and/or cropped image is displayed to users. Computing device 102 may optionally include a memory slot 114, a disk drive 116 for storing image files and application program files, and a keyboard 106 for providing data input. A mouse 108 is also provided to permit execution of commands by the computing device 102.

In an exemplary embodiment, the computer program executed by the computing device 102 of FIG. 1 analyzes the images received from the scanner 100, converts the images to text, analyzes the text data, extracts expense data, and puts the extracted expense data into an expense report. In another exemplary embodiment, the computer program executed by the computing device 102 of FIG. 1 analyzes business card or other documents images received from the scanner 100, converts the images to text, analyzes the text data, extracts contacts data, and puts the contacts data into a contacts database. An exemplary system for capturing, storing and processing documents, such as receipts and business cards, are described in U.S. Pat. No. 7,069,240. The contents of that patent are hereby incorporated by reference in their entirety.

Table Grid Detection and Separation

Figure 2:
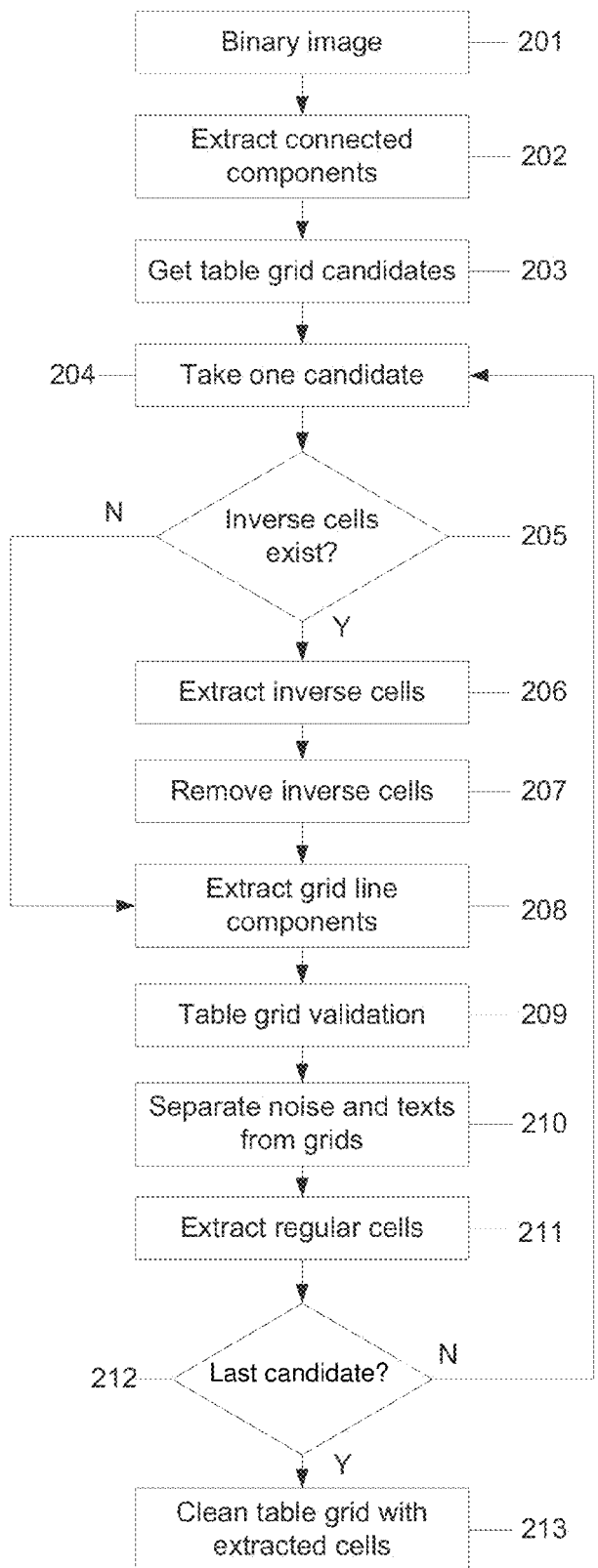
FIG. 2 is a flowchart of table grid detection and separation in accordance with the invention.

The techniques of the invention relate to processing scanned document images to detect table grids and to separate the text from the table grid for inclusion of the text in, for example, an expense report. FIG. 2 is a flowchart of table grid detection and separation in accordance with the invention. As illustrated, the starting point of the proposed approach is a binary image received from the scanner 100, for example at 201. Color and grayscale images are binarized at 201 by applying, for example, an adaptive image binarizer. Then, at 202, all connected components are extracted from the binary image in a conventional fashion. As shown in FIG. 2, after obtaining the connected components, the technique is divided into the following steps: get table grid candidates (203); for each table grid candidate (204-212), determine if inverse cells exist (205) and, if so, extract (206) and remove inverse cells (207); extract grid line components (208); validate the table grid (209); separate noise and touching texts from the table grids (210); and extract regular cells (211) if necessary. The result is a clean table grid with extracted cells (213). Each step of this approach will be described in detail below.

Before describing the technique in detail, the following two data structures will be defined to help the description and the understanding of the algorithm described below.

The first data structure NCRun is used to represent a run on a binary image. Each run is a sequence of connected pixels with the same value and on the same row of an image. The structure NCRun has three integer variables: Row, cFirst and cLast whose meanings are included in the code definition. The enlarged character 'V' shown in FIG. 3(a) will be used as an example to explain the concept of NCRun. In FIG. 3(a), each black block represents a black pixel on the binary image. In FIG. 3(a), character 'V' has dimension 27×29 pixels. Each row in rows 0 to 22 (numbered from top of "V") contains two runs, while each row in rows 23 to 28 contains only one run. Assuming the top-left point coordinates are (0, 0), the three member variables of the first NCRun in the first row have values Row=0, cFirst=0 and cLast=5. Thus

```
struct NCRun{
    int Row;      //the row of the run on the image
    int cFirst;   //the first column of the run on the image
    int cLast;    //the last column of the run on the image
}
```

The above definition of NCRun can be called a horizontal run since all pixels in a run are on the same row. However, NCRun also may be defined in the vertical orientation as follows. In the technique described herein, many times both horizontal and vertical runs are required. Fortunately, the fast run extraction method used to extract horizontal runs can be applied to extract vertical runs without any code change by rotating the original image counter-clockwise by 90 degree then flip the image upside down as shown in FIG. 3(b). In other words, a vertical run may be defined as:

```
struct NCRun{
    int Column;    //the column of the run on the image
    int rFirst;    //the first row of the run on the image
    int rLast;     //the last row of the run on the image
}
```

It should be noted that for the same image the numbers of horizontal runs and vertical runs are usually not the same. For example, the character 'V' shown in FIG. 3 has 52 horizontal runs but only 27 vertical runs. In the following description, unless clearly specified, all runs mean horizontal runs.

The second data structure NCConnComponent is used to represent a 'connected component' on a binary image. Each connected component is a group of connected runs where 'connection' is defined as an 8-neighbor field connection. NCConnComponent contains four integer member variables x, y, w and h and a vector member variable runs whose meanings are included in the following code definition:

```
struct NCConnComponent{
    int x;    //the X coordinate of the top-left corner of the
              connected component
    int y;    //the Y coordinate of the top-left corner of the
              connected component
    int w;    //the width of the connected component
    int h;    //the height of the connected component
    vector<NCRun> runs;    //the vector of runs contained in
                          the connected component
}
```

Figure 3:
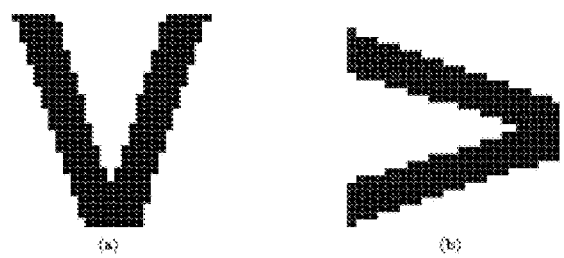
FIG. 3 illustrates an enlarged character 'V' to illustrate the definition of a 'run' and a 'connected component,' where (a) is the original image and (b) is the rotated and flipped image used to extract vertical runs.

In FIG. 3, character 'V' can be represented with one single connected component. By assuming the top-left point coordinates to be (0, 0), the four integer member variables have values x=0, y=0, w=27 and h=29 and the vector runs contains 52 runs inside.

Get Table Grid Candidates (Step 203; FIG. 2)

The procedure to get table grid candidates is based on the size of the connected component obtained in step 202. Given an image with resolution R (unit is DPI), the thresholds used to obtain table grid candidates are $T_{gmin}$=R/4 (minimum grid size) and $T_{cmin}$=R/10 (minimum table cell size). Given a connected component with dimension w×h, it is considered a table grid candidate if $\max(w,h) \geq T_{gmin}$ and $\min(w,h) \geq T_{cmin}$.

Extract and Remove Inverse Cells (Steps 206 and 207; FIG. 2)

Figure 4:
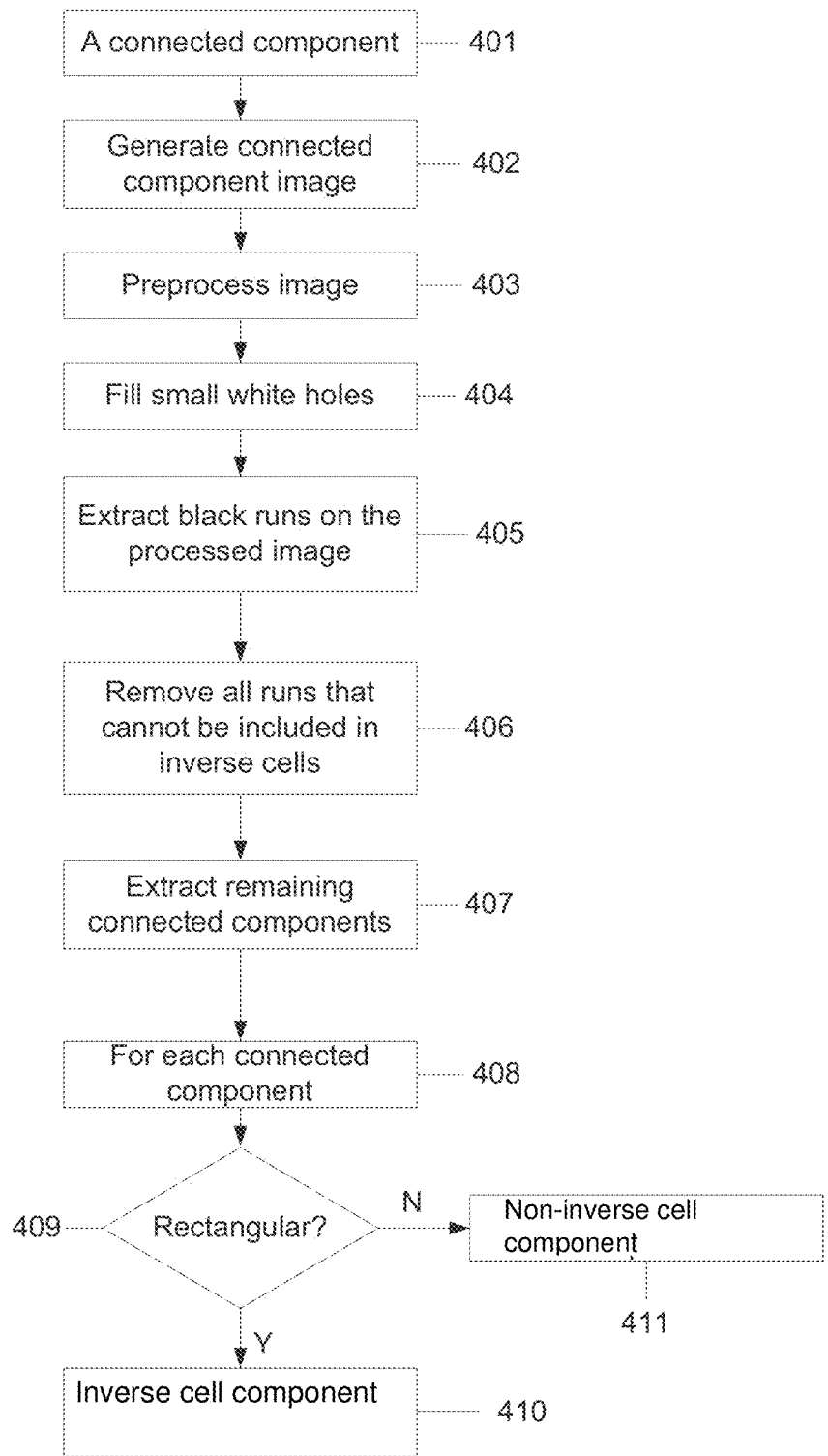
FIG. 4 illustrates the procedure to detect and extract inverse cells from a connected component in accordance with the invention.

An inverse cell is defined as a cell in a table with inverse (white) text on a dark background. Since inverse cell components on a table grid affect the extraction of horizontal and vertical line components and the validation of the table grid, inverse cells should be extracted and separated from the original connected component first if a table grid is determined at step 206 to contain inverse cells. The procedure to detect and extract inverse cells is shown in the flowchart of FIG. 4. All major steps in this procedure are described below.

Pre-Processing

A connected component contains all required information to describe the component; therefore, it is a straight-forward process to generate a binary image from the connected component received at 401 by assigning a white background and assigning all pixels in the connected component a black value at 402. The generated binary image is pre-processed at 403 to help the detection and extraction of inverse cells. In the image pre-processing step 403, a smearing operation is applied to the binary image in both horizontal and vertical directions. This operation can help the detection and extraction of inverse cells with a meshed dark background. The pseudo code of the horizontal smearing is:

```
for each row on the binary image
    find all white gaps between two black pixels
    for each white gap
        compute the length L of the gap
        if L<=T then
            fill the gap with black pixels
        end
    end
end
``` where T is a predefined gap length threshold depending on the resolution of the original image. In an exemplary implementation, T=5 for an image with resolution 300 DPI. The vertical smearing operation is different from the horizontal smearing operation only in that the operation is on columns instead of rows.

FIG. 5 gives a pre-processing example which shows a connected component before (FIG. 5(a)) and after (FIG. 5(b)) the pre-processing. As illustrated, the pre-processing can make the inverse part solid and easier to detect and extract.

Fill Small White Holes

Given the image resolution R with unit DPI, a threshold $T_h$ is defined as T=R/7. A white hole (with width $w_{hole}$, height $h_{hole}$ and pixel number $N_{hole}$) on the binary image is considered a small hole if it satisfies any one of the following two conditions.

$$\max(w_{hole}, h_{hole}) < T_{hole} \quad (1)$$

$$N_{hole} < T_h^2, h_{hole} < 5 w_{hole} \quad (2)$$

All identified small holes will be filled with solid black color at 404. For example, the obtained binary image after filling small white holes of image in FIG. 5(b) is shown in FIG. 6(a).

Remove Non-Inverse Cell Runs

At 405, both horizontal and vertical runs are extracted from the processed binary image with small holes filled. All runs with length shorter than a predefined length threshold $T_l$ are identified as short runs that can not be included in an inverse cell at 406. All short runs are removed by setting pixels in short runs to be white (background) color. In an exemplary implementation, $T_l$=R/10, where R is the resolution of the original image. FIG. 6(b) shows the result after removing all short runs from the image shown in FIG. 6(a).

Inverse Cell Validation

At 407, all black connected components are extracted from the binary image obtained from 406. Based on the assumption that all cells in a table should have a rectangular shape, the extracted connected components are validated at 408-411 to check if they can be an inverse cell component. For example, for each extracted component (with perimeter S, width $w_c$, height $h_c$ and pixel number $N_p$), the rectangularity degree $D_{rect}$ of this connected component is computed at 408 as follows:

$$D_{rect} = \min\left(\frac{N_p}{w_c \cdot h_c}, \frac{N_p}{\frac{S - 2\min(w_c, h_c)}{2} \cdot \min(w_c, h_c)}\right)$$

If the rectangularity degree $D_{rect}$ is larger than a predefined high threshold $T_{hr}$ at 408, then the connected component is considered a valid inverse cell component at 410. On the other hand, if the rectangularity degree $D_{rect}$ is smaller than a predefined low threshold $T_{lr}$ at 408, then the connected component is considered an invalid inverse cell component at 411. For any component with $D_{rect}$ satisfies $T_{lr} \leq D_{rect} \leq T_{hr}$, a second checking step is required. Because of the skewing of scanned images, a rectangle shape on the original document might appear as a parallelogram. The second checking step is to make sure that these shapes are also considered as inverse cell components.

For the second step validation, the variance $V_r$ of the lengths of all runs in the connected component is computed as follows:

$$V_r = \begin{cases} \text{var(lengths of all horizontal runs)} & \text{if } w_c < h_c \\ \text{var(lengths of all vertical runs)} & \text{Otherwise} \end{cases} \quad (1)$$

where var(.) is an operator to compute the variance of an integer sequence. Once the run length variance is available, the decision is made as follows:

$$\text{Component is} = \begin{cases} \text{inverse cell component} & \text{if } V_r \leq 10 \\ \text{not inverse cell component} & \text{Otherwise} \end{cases} \quad (2)$$

Figure 6:
FIG. 6 illustrates an example of filling small white holes and removing non-inverse cell runs for inverse cell detection and extraction, where (a) is the obtained image after filling small white holes and (b) is the obtained image after removing non-inverse cell runs.

The rectangularity degree $D_{rect}$ of the connected component shown in FIG. 6(*b*) is 96, so it is definitely an inverse cell component. Once a connected component is decided as an inverse cell component, the filled holes are put back to restore the original shape of the cells.

Extract Grid Line Components (Step 208; FIG. 2)

If a table grid contains inverse cells that are detected as described above, these inverse cells will be subtracted from the original connected component before extracting grid line components. For the table grid shown in FIG. 5, for example, the obtained connected component after subtracting the inverse cell components is shown in FIG. 8(*a*).

Figure 7:
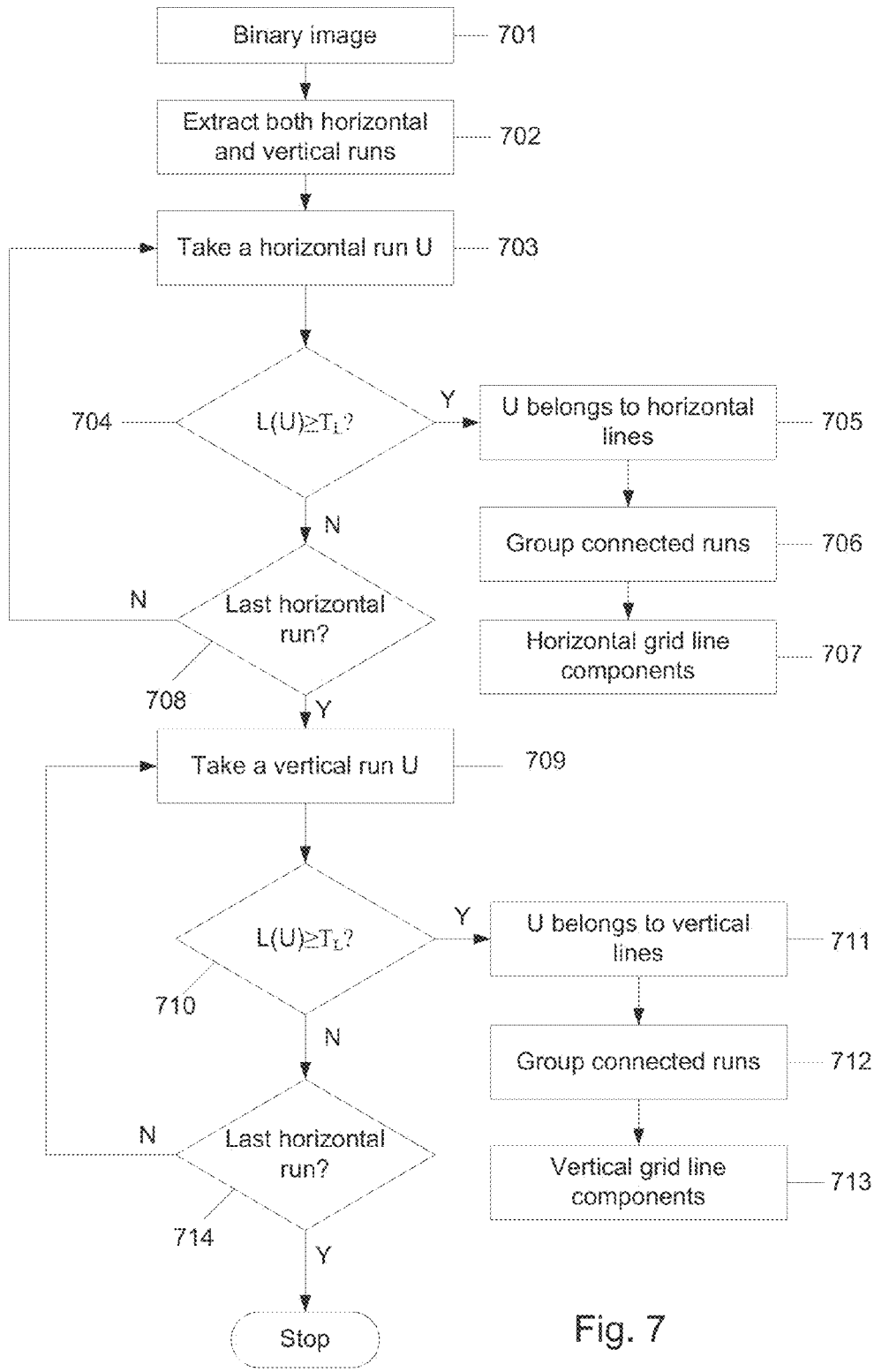
FIG. 7 is a flowchart showing how to extract grid line components from a binary grid image.

Once the grid with inverse cells subtracted is available, grid line (horizontal and vertical line) components are extracted from the obtained grid image. Because of the skewing during scanning, a long straight line may appear as a group of connected line segments. Although a Hough transform is an effective approach to detect lines from a binary image, the algorithm has the following two disadvantages which make Hough transform inappropriate for use in the method of the invention: (1) the algorithm is extremely slow when the original image is large; and (2) end points of detected lines have to be decided by going through the original image. In accordance with the invention, a line detection and extraction algorithm based on runs is used instead of the Hough transform. The algorithm has the following two advantages that are exactly the opposite of Hough transform's disadvantages: (1) The algorithm runs very fast; and (2) Detected lines are extracted automatically as line segments. The procedure of this algorithm is shown in the flowchart of FIG. 7, where L(.) is an operator to compute the length of a run, and $T_L$ is a threshold to decide based on image resolution and skewing tolerance. Basically the larger the skewing, then the smaller the value of $T_L$. In an exemplary implementation, $T_L = R/6$, where R is the image resolution.

In the flowchart shown in FIG. 7, the horizontal and vertical grid line components 707 and 713 are the output of this procedure. The basic idea of grid line extraction can be described as follows: any horizontal run with length not smaller $T_L$ is considered a part of the horizontal grid line components, and any vertical run with length not smaller than $T_L$ is considered a part of the vertical grid line components. A group of connected horizontal runs belonging to horizontal line components is a horizontal line segment, and a group of connected vertical runs belonging to vertical line components is a vertical line segment. In FIG. 7, the binary grid image is obtained at 701 and horizontal and vertical runs are extracted at 702. For each horizontal run U (703, 708), it is determined at 704 whether $L(U) \geq T_L$. If $L(U) \geq T_L$, then U is a horizontal line (705) with group connected runs (706) and corresponds to the horizontal grid line components (707). On the other hand, if $L(U) < T_L$, the process is repeated for the next horizontal run U. The same process is followed at 709-714 for the vertical runs.

Figure 8:
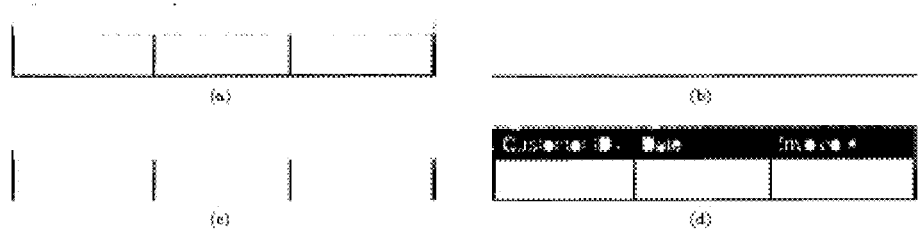
FIG. 8 illustrates an example of grid line component extraction, where (a) is the obtained grid after inverse cell subtraction, (b) is the extracted horizontal grid line components, (c) is the extracted vertical grid line components, and (d) is the obtained grid (inverse cells and grid lines).

FIGS. 8(*b*) and 8(*c*) show the extracted horizontal grid line and vertical grid lines, respectively, from the grid image shown in FIG. 8(*a*). By combining the extracted grid lines and inverse cell components, the clean table grid component is obtained as shown in FIG. 8(*d*), where white holes are restored.

Table Grid Validation (Step 209; FIG. 2)

Figure 9:
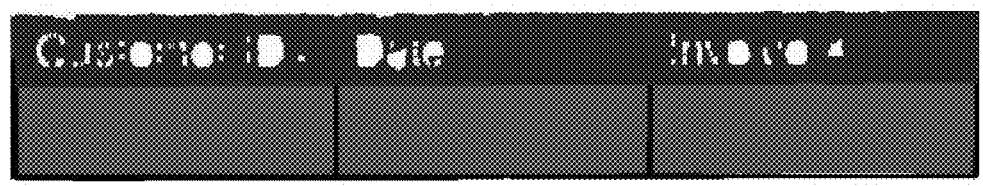
FIG. 9 illustrates extracted table grid cells, including the inverse cell, three regular cells, and the extracted grid lines.

For some steps of the table grid validation, it is desirable to extract the regular table cells first. The procedure to extract regular cells is similar to the procedure to extract inverse cells. The only difference is, instead of extracting all black runs, all white runs are extracted from the clean grid image. After all white runs are available, the process to remove non-regular-cell runs is exactly the same as the procedure shown in FIG. 4. FIG. 9 shows the extracted grid cells from the image shown in FIG. 8(*d*).

Figure 10:
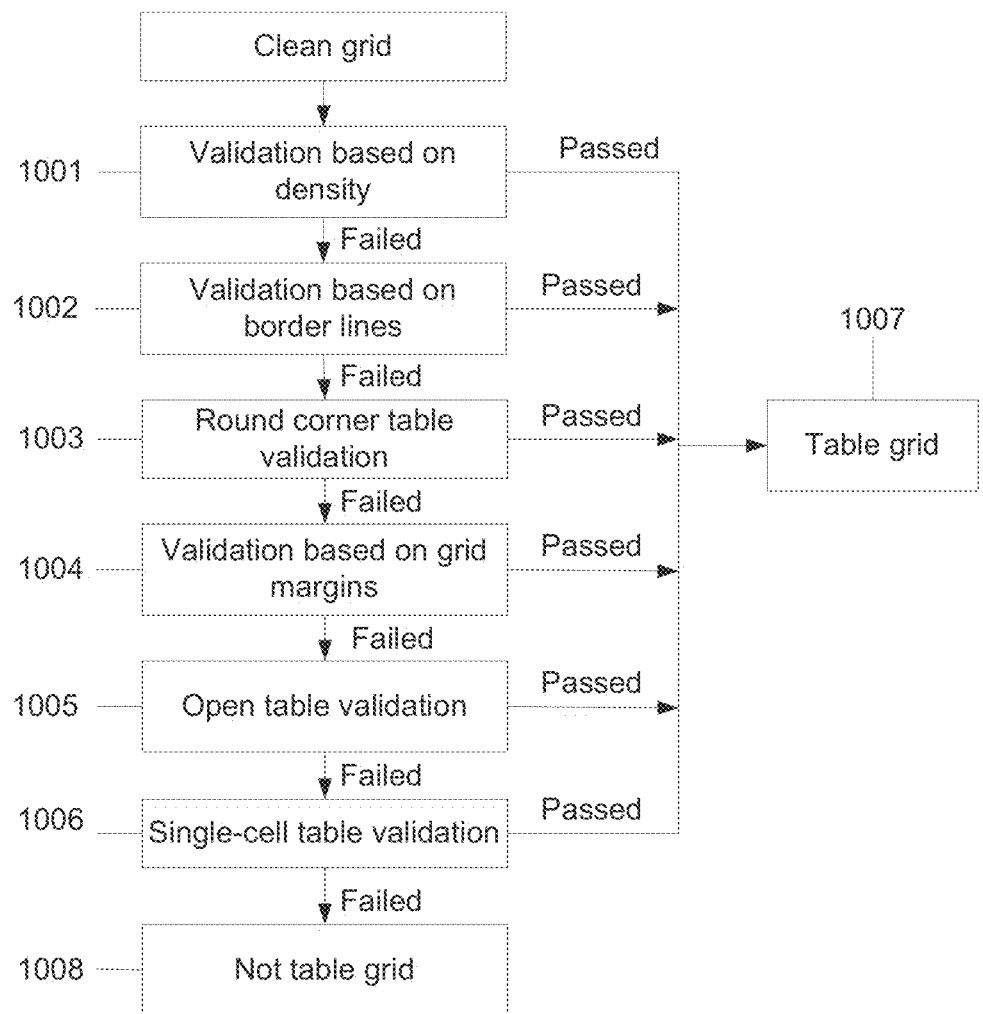
FIG. 10 illustrates an exemplary procedure to validate an extracted clean grid.

There are certain amount of documents that contains graphics such as logos. Some of these graphics components might contain some solid components that are detected as inverse cell components, line drawings that are extracted as grid line components, and white holes that are extracted as regular cells. The goal of the 'table grid validation' step is to remove those graphics components that satisfy part of the table grid criteria thus are incorrectly detected as table grids. The validation process is a six-step procedure, as shown in FIG. 10, where each block 1001-1006 represents one validation step. If any one of the six validation steps is passed, the extracted grid is considered a table grid at 1007. In other words, a grid is not considered to be a table (1008) only when all six steps of validation have failed.

The details of each validation step will be described in detail below. Before providing such details, some thresholds based on image resolution will be defined and some values will be pre-computed as well. Given the following connected component information:

$CC_o$: the original connected component without any processing;
$CC_c$: the clean connected component containing only inverse cell and grid line components;
ICC: the group that contains all inverse cell components;
HCC: the group that contains all horizontal grid line components;
VCC: the group that contains all vertical grid line components;

$W_o$ and $H_o$: the width and height of $CC_o$;
$W_c$ and $H_c$: the width and height of $CC_c$;
$N_h$: the number of horizontal line components in HCC;
$N_v$: the number of vertical line components in VCC;
$N_{po}$: the number of pixels in $CC_o$;
$N_{pi}$: the number of pixels in all inverse cell components;
$N_{ph}$: the number of pixels in all members of HCC;
$N_{pv}$: the number of pixels in all members of VCC;
$N_{pr}$: the number of remaining pixels after removing inverse cells and all grid lines from $CC_o$;
one predefines and pre-computes the following values:
$D_h$: the high density threshold (70 in an exemplary implementation);
$D_l$: the low density threshold (5 in an exemplary implementation); and
$T_{cgmin}$: the minimum clean grid size (R/10 in an exemplary implementation).

Validation Based on Density (Step 1001; FIG. 10)

The step 1001 of validation based on density is divided into two more steps. One step is based on the high density threshold $D_h$, and another step is based on the low density threshold $D_l$. The two steps of validation are described as follows:

1. Validation Based on High Density

A connected component will be validated based on high density only if $D > D_h$ is satisfied, where $$D = \frac{N_{po}}{W_o \cdot H_o}$$

is the density of the original connected component. If $D > D_h$ is satisfied, the ratio $R_t$ between the number of inverse cell component pixels and the number of the original connected component pixels is computed as $$R_t = \frac{N_{pi}}{N_{po}}.$$

The decision is made as follows:

$$\text{Validation} = \begin{cases} \text{passed} & \text{if } R_t > 0.2 \\ \text{failed} & \text{if } R_t \leq 0.2 \end{cases} \quad (3)$$

This step of validation will capture the table grids containing large inverse cell components.

2. Validation Based on Low Density

In this step of validation, the same density D (the density of the original connected component) is computed. The decision is made as follows:

$$\text{Validation} = \begin{cases} \text{passed} & \text{if } D < D_l \\ \text{failed} & \text{if } D \geq D_l \end{cases} \quad (4)$$

This step of validation will capture the large table grids containing no inverse cell components.

Validation Based on Border Lines (Step 1002; FIG. 10)

Because of noise on scanned images, a table grid on a binarized image might have broken grids that make the table incomplete. This step of validation will try to capture these incomplete table grids. The procedure of validation based on border lines is as follows:

1. The table grid should be an incomplete grid. A grid that satisfies $\min(N_h, N_v) = 1$ is identified as an incomplete grid.

2. Every line component should be long enough. A line component (either horizontal or vertical line) with width $W_l$ and height $H_l$ is considered a long-enough line only if $\max(W_l, H_l) \geq 5 \cdot \min(W_l, H_l)$.

3. All line components should be large enough. The line components are considered as large enough only if the condition $$(N_{po} - N_{pr}) \geq \frac{N_{po}}{3}$$

is satisfied.

4. Clean grid size should be large enough. A clean grid is considered to be large enough only if $\min(W_c, H_c) \geq T_{cgmin}$ is satisfied.

It should be noted that, if any of these steps of validation failed, the validation will terminate immediately by reporting a failure message back.

Round Corner Table Validation (Step 1003; FIG. 10)

For a table grid with round corners, the grid line extraction process will break the grid borders into unconnected lines. The result is runs in the clean grid $CC_c$ that are not connected into one single connected component. In this step of validation, these types of table grids are captured, and the round corners are put back to the clean grid later (see below).

The first step of round-corner table validation is to check the number of horizontal and vertical line components. Only when $\min(N_h, N_v) \geq 2$ is satisfied, will the next step proceed. From the grid line components, four margin lines are identified that are two horizontal lines with minimum and maximum Y coordinates and two vertical lines with minimum and maximum X coordinates. If the original table grid is a round-corner rectangle with perimeter S, then the sum $S_l$ of the lengths of these four lines is $S - S_c$, where $S_c$ is the sum of four corner lengths and S is computed as $S = 2 \cdot (W_o + H_o)$.

The grid is considered to be a round-corner grid only if the following two conditions are satisfied:

$$S_l \geq 0.8 \times S \quad (5)$$

$$W_c \times H_c \geq 0.8 \times W_o \times H_o \quad (6)$$

where the first condition is based on the grid perimeter and the second condition is based on grid area.

Validation Based on Grid Margins (Step 1004; FIG. 10)

On real documents such as invoices, it is common for handwriting to pollute the original table grid, especially the bounding box of the grid. Sometimes, the handwriting may contain one or multiple line components. Since the handwriting can make the bounding box of the grid much larger than a clean grid, the previous steps of validation based on size will fail with very high probability. In this validation procedure, these polluted table grids are captured by removing the effects of the handwriting.

As in the previous validation step, $\min(N_h, N_v) \geq 2$ is the precondition of this validation step. If this condition is satisfied, from those line components, the two longest horizontal lines and two longest vertical lines are identified with a length tolerance $T_t$. The tolerance $T_t$ is set to make sure one can correctly identify the four margins of the grid. $T_t = 10$ in an exemplary implementation. The procedure to identify the two horizontal margins is:

1. Get the longest horizontal line with length L from HCC;
2. Get all lines inside HCC with length larger than $L - T_t$ and put them in a group G; and 3. From G, take the line with the minimum Y coordinate as the top margin and the line with the maximum Y coordinate as the bottom margin.

The procedure to identify the two vertical margins is the same.

After obtaining these four margin lines, where each line is a connected component represented with NCConnComponent, $C_L$ and $C_R$ are used to represent the left and the right margins and $C_T$ and $C_B$ are used to represent the top and bottom margins. The following values are computed:

$Dis_{LR}=C_R \cdot x+C_R \cdot w-C_L \cdot x$: the distance between the left and right margins;

$Dis_{TB}=C_B \cdot y+C_B \cdot h-C_T \cdot y$: the distance between the top and bottom margins;

$Dif_{LR}=|C_L \cdot y-C_R \cdot y|+|C_L \cdot y-C_R \cdot y+(C_L \cdot h-C_R \cdot h)|$: the position difference between end points of the left and right margins;

$Dif_{TB}=|C_T \cdot x-C_B \cdot x|+|C_T \cdot x-C_B \cdot x+(C_T \cdot w-C_B \cdot w)|$: the position difference between end points of the top and bottom margins;

$Dif_H=|C_L \cdot h-C_R \cdot h|$: the height difference between the left and right margins; and $Dif_W=|C_T \cdot w-C_B \cdot w|$: the width difference between the top and bottom margins.

Figure 11:
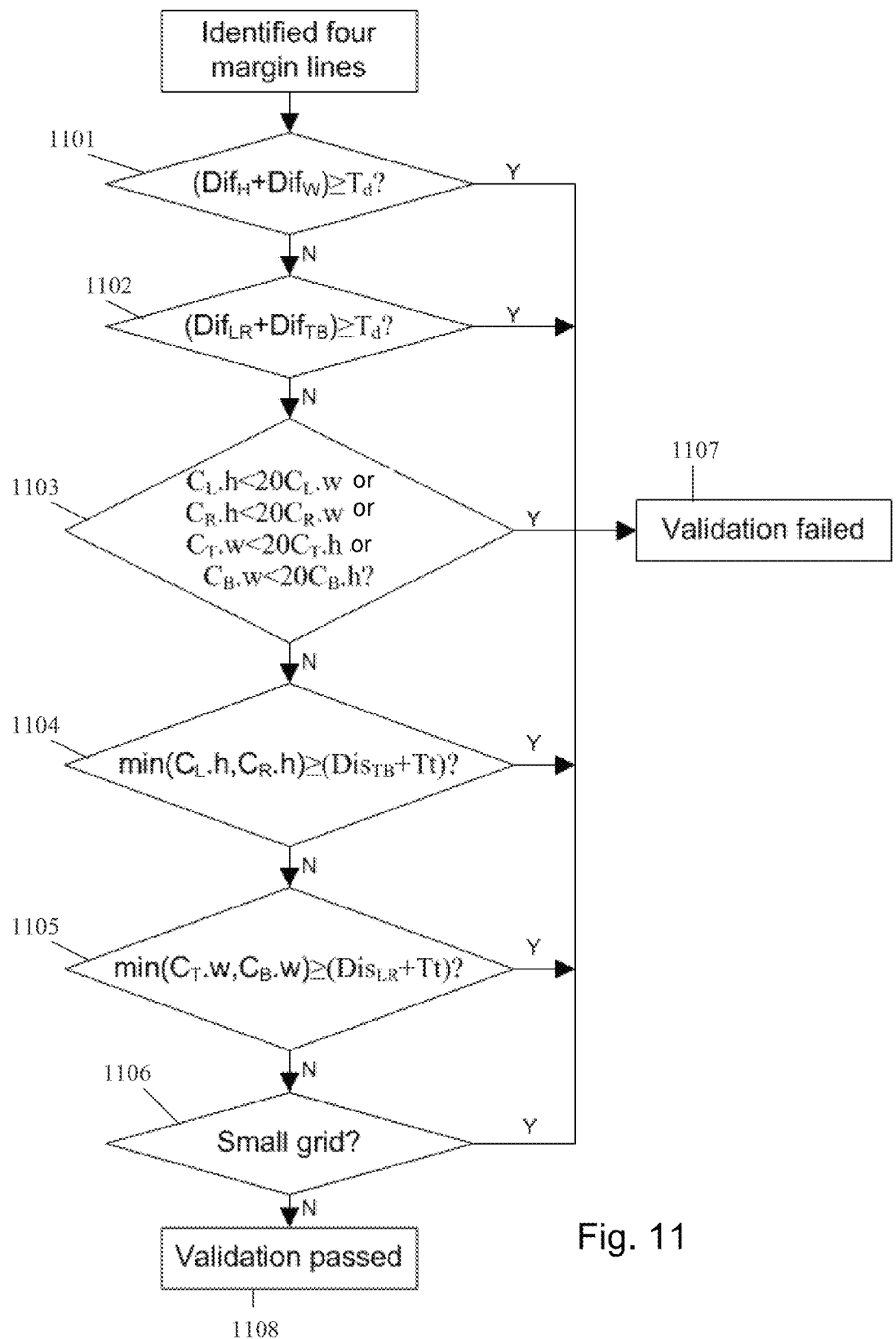
FIG. 11 illustrates the validation of four margins of a polluted table grid.

Predefining a distance threshold $T_d$, the procedure of validation is shown in FIG. 11. The meaning of each step is as follows:

1. Step 1101: Validate that every pair of margins have the same length;
2. Step 1102: Validate that every pair of margins are at the same level;
3. Step 1103: Validate that there exists at least one thin margin (remove the affection of inverse components);
4. Step 1104: Validate that the left and right margins are parallel;
5. Step 1105: Validate that the top and bottom margins are parallel; and
6. Step 1106: Validate that the new grid is large enough (using threshold $T_{cgmin}$ defined above).

Once the validation of FIG. 11 is passed at 1108, a new clean grid will be generated. All other components out of the bounding box defined by these four margins are considered as noise. In an exemplary implementation, $T_d=40$ which is decided based on experimental results. It certainly can take other values if higher performance can be obtained.

Open Table Validation (Step 1005; FIG. 10)

On invoice documents, for example, a certain amount of open tables exist that can not pass any previous step of validation. In this step, this type of table is captured. An open table is defined as a table grid with only top and bottom margins and one or multiple vertical separator lines. Open tables usually do not contain any inverse header. The validation of an open table is similar to the previous step (FIG. 11). After obtaining the top and bottom margins $C_T$ and $C_B$ and the longest vertical separator line with length $L_{max}$, the following values are computed:

$Dis_{TB}=C_B \cdot y+C_B \cdot h-C_T \cdot y$: the distance between the top and bottom margins;

$Dif_{TB}=|C_T \cdot x-C_B \cdot x|+|C_T \cdot x-C_g \cdot x+(C_T \cdot w-C_g \cdot w)|$: the position difference between end points of the top and bottom margins; and $Dif_w=|C_T \cdot w-C_B \cdot w|$: the width difference between the top and bottom margins.

Figure 12:
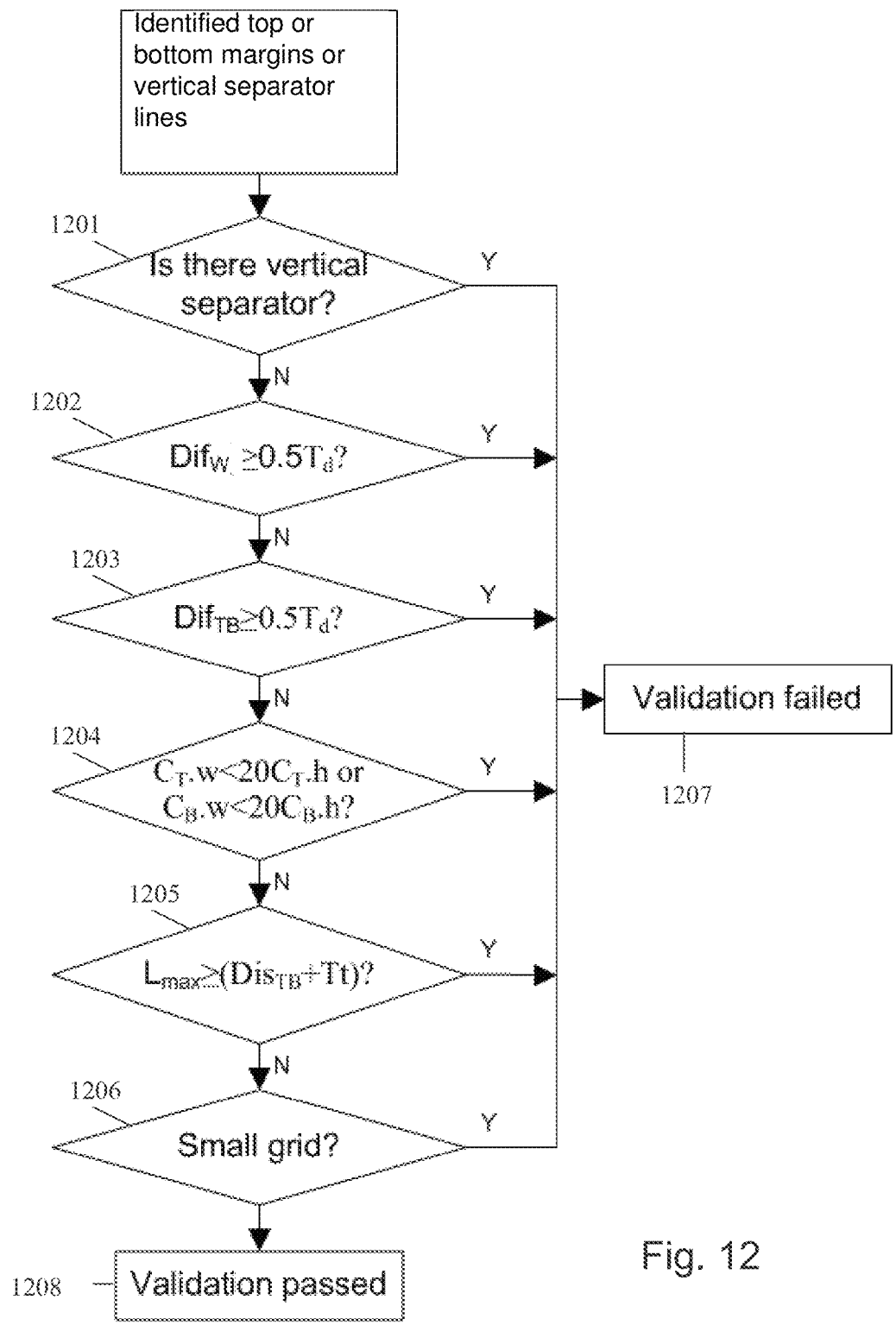
FIG. 12 is a flowchart of open table validation in accordance with the invention.

The open table validation procedure is shown in the flow chart of FIG. 12. The properties validated in each step are as follows:

1. Step 1201: Validate that there exists at least one vertical separator line;
2. Step 1202: Validate that the top and bottom margins have the same length;
3. Step 1203: Validate that the top and bottom margins are at the same level;
4. Step 1204: Validate that both the top and bottom margins are thin margins;
5. Step 1205: Validate that the top and bottom margins are parallel; and
6. Step 1206: Validate the new grid is large enough (using threshold $T_{cgmin}$ defined above).

As in FIG. 11, once the validation is passed, a new clean grid will be generated from the two margins and the vertical separator lines. All other components out of the bounding box defined by these two margins are considered as noise. The values of $T_t$ and $T_d$ are also the same as in FIG. 11.

Single-Cell Table Validation (Step 1006; FIG. 10)

A single-cell table usually can pass one or several of the previous steps of validation. However, because of the skewing caused by scanning, margins of a single cell might not be thin enough or parallel in the horizontal and vertical directions. In this step, skewed single-cell tables are captured. Given the original grid component $CC_o$ (with dimensions $W_o$ and $H_o$), the validation of a single-cell procedure is:

1. Generate the binary image from $CC_o$;
2. Add a black bounding box (rectangle) to the image;
3. Extract all white holes from the image and get the hole with the maximum area $A_{max}$; and
4. Make decisions as follows:

$$\text{Validation} = \begin{cases} \text{passed} & \text{if } A \geq 0.75 W_o \times H_o \\ \text{failed} & \text{if } A < 0.75 W_o \times H_o \end{cases} \quad (7)$$

Separate Noise and Touching Texts from Table Grids (Step 210; FIG. 2)

The table grid that passed the validation (step 209) is a clean grid containing only inverse cells and long grid lines. However, after the scanning, there is a lot of noise added to the grid lines that make the lines not have the same thickness. This noise usually appears as small black spots on the component image with the clean grid removed. On the other hand, printing texts and handwriting on documents can touch grid lines too. While handwriting can be identified as graphics or noise, printing texts should also be identified as texts so that they can be put back into the original image to help with the accuracy of the OCR process.

Figure 14:
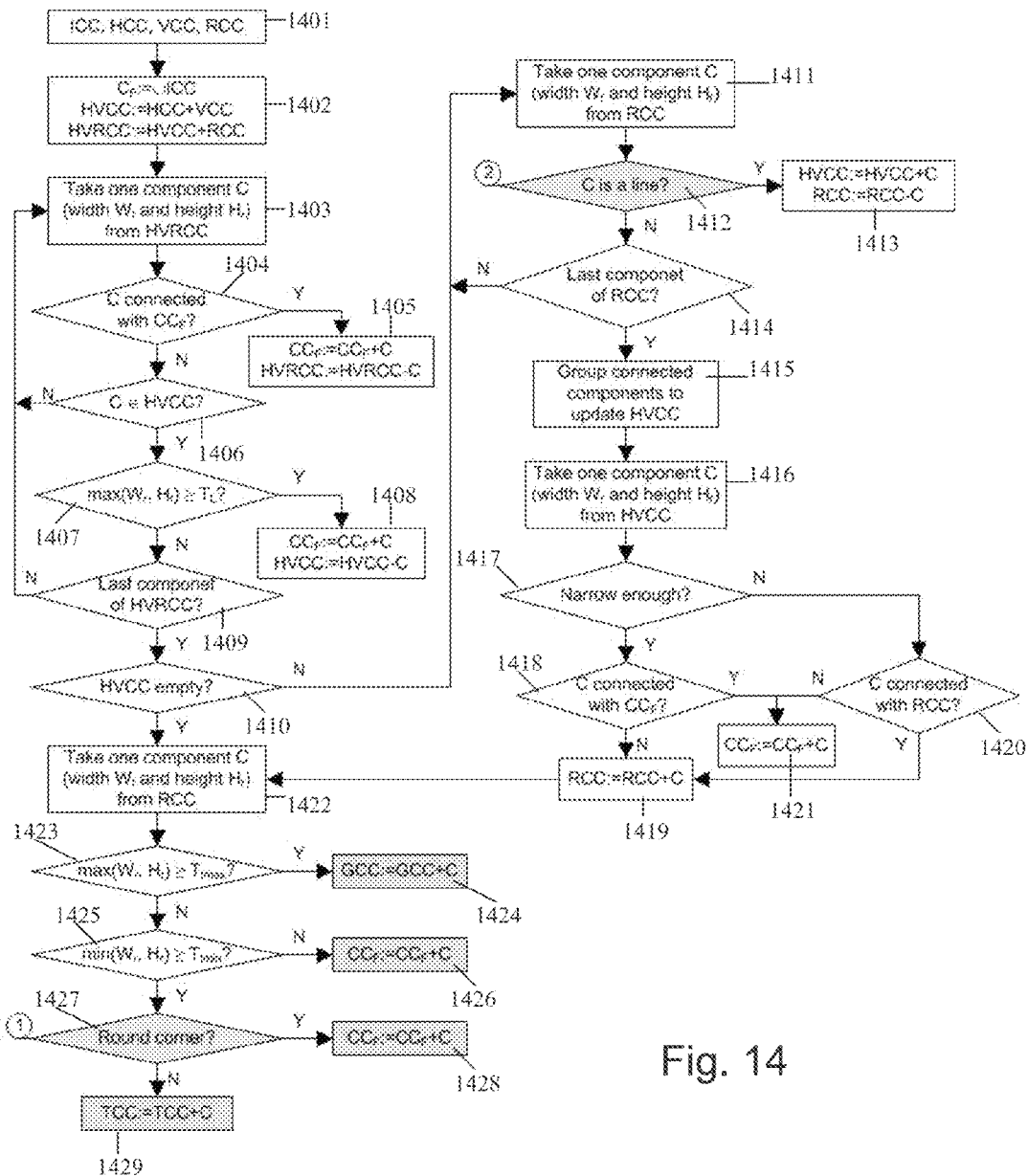
FIG. 14 illustrates the restored grid and separate touching texts and graphics.

The operations in this step will restore the original grids and also separate touching text and handwriting from the grids. For example, the image shown in FIG. 13(*b*) is the obtained image after removing the clean grid from the connected component image shown in FIG. 13(*a*). As shown, it contains both grid remainders and touching text (letter J). All of these remaining black components RCC are collected and the process shown in the flowchart of FIG. 14 is performed. In the flowchart of FIG. 14, ICC, HCC and VCC have the same meanings as above. The definitions of other variables are:

RCC: the group containing all remaining black connected components after removing ICC, HCC, VCC from the original connected component;

$CC_F$: the final grid (a single connected component);

GCC: the group containing all graphics components;

TCC: the group containing all text components;

$T_{tmax}=R/4$: the maximum text size;

$T_{tmin}=3$: the minimum text size; and $T_L=R/3$: the threshold used to decide if a line is a long line.

The procedure of the separation can be divided into three major phases. The details of operations in each major phase are described below.

1. Generate the Initial Grid

In the flowchart of FIG. 14, the first phase (steps 1401-1410) stops at the checking point "HVCC empty?" (1410). In this phase, the output grid is first initialized by merging all inverse cell components into one single connected component at 1401, 1402. Then all components in HVRCC that connected with the initial grid are merged to the grid (1403-1406). All grid lines that are longer than $T_L$ are merged to the grid at 1407-1408. After all the operations in the first phase (loop 1403-1409 is completed), HVCC should contain only grid lines shorter than $T_L$ and RCC contains all remaining components that are not connected with the inverse cell component.

2. Classify Short Lines and Remaining Components

The second phase contains all the operations on the right half (steps 1411-1421) of the flowchart of FIG. 14. Operations in this phase will be performed only if the updated HVCC is not empty at 1410. In other words, only when the extracted grid lines contains some short lines will steps 1411-1421 be performed.

In steps 1411-1414 of this phase, all components in RCC that comprise a short straight segment are put in non-empty HVCC. Then, all components in HVCC that are connected are merged (1415). Next, for each connected component C in the updated HVCC (1416), the following operations will happen:

(a) C is merged to $CC_F$ if it is a short line and connected with $CC_F$ (1418);

(b) C is added to RCC if it is a short line but is not connected with $CC_F$ (1419);

(c) C is added to RCC if it is not a short line but connected to at least one component in RCC (1420, 1419); and (d) C is merged to $CC_F$ if it is not a short line and not connected with any component in RCC (1421).

At 1412, the connected component C is considered to be a line if any one of the following two conditions is satisfied:

$$\max(W_r, H_r) \geq 20 \min(W_r, H_r) \quad (1)$$

$$\max(W_r, H_r) \geq 5 \min(W_r, H_r) \text{ and } V < 2 \quad (2)$$

where V is the variance of horizontal run lengths for vertical lines and the variance of vertical run lengths for horizontal lines.

3. Classify Remaining Components

After the completion of steps 1411-1421, the group HVCC is now empty (1410), and a component used to be inside (1422) is merged to the grid or added to RCC. In this step, the components in RCC are classified into graphics, grid or texts. The procedure is as follows:

(a) A large component (with one dimension larger than the maximum text size $T_{tmax}$) is considered as graphics (handwriting) at 1423-1424;

(b) A small component (with one dimension smaller than the minimum text size $T_{tmin}$) is considered as a grid at 1425-1426;

(c) A component with text size will be checked to see if it has one round corner and the round corner component will be merged into a grid at 1427-1428; and (d) All components with text size that are not round corners will be classified as text and put in TCC at 1429.

Figure 15:
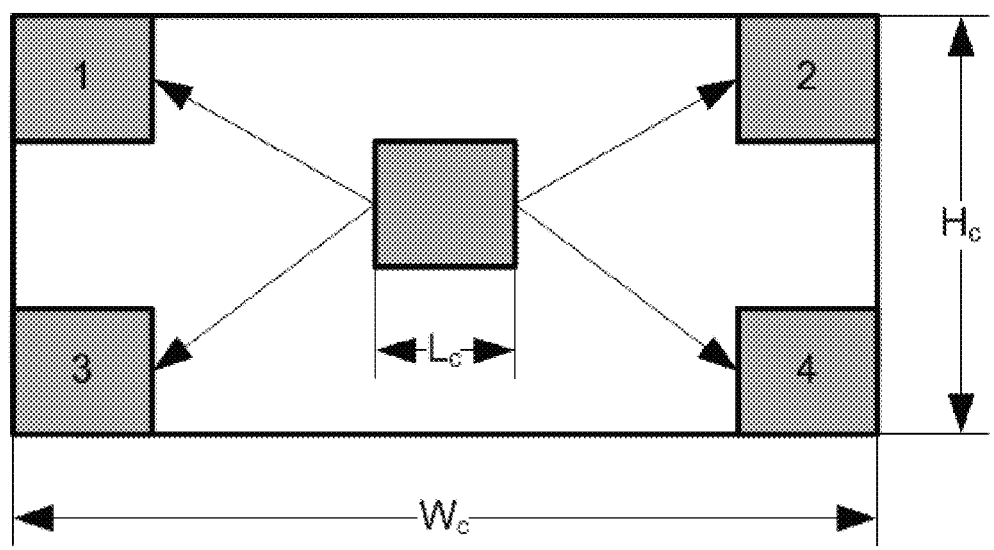
FIG. 15 illustrates positions to check if a component is a round corner component.

At 1427, the round corner checking operates as follows:

(a) Decide the round corner size as $$L_c = \min\left(\frac{\min(W_c, H_c)}{3}, \frac{R}{3}\right),$$

where $W_c$ and $H_c$ is the width and height of the grid component; and (b) If the component falls in one of the four round corner positions shown in FIG. 15, then it is a round corner component.

FIG. 13(c) shows the restored grid and FIG. 13(d) shows the separated text from the original grid.

After all the previous steps, a restored grid is obtained with detected inverse cells and without any touching texts and graphics. Obviously, if the original grid is polluted by touching texts or graphics, regular cells need to be re-extracted from the restored grid using the approach described in the table grid validation section above. The final output of all of the operations described herein is a restored grid with both inverse and regular cells, separated text and separated graphics. The next step is to read the table in a correct reading order and to process the separated text and separated graphics in the desired manner (see, for example, U.S. Pat. No. 7,069,240).

EXAMPLES

Figure 16:
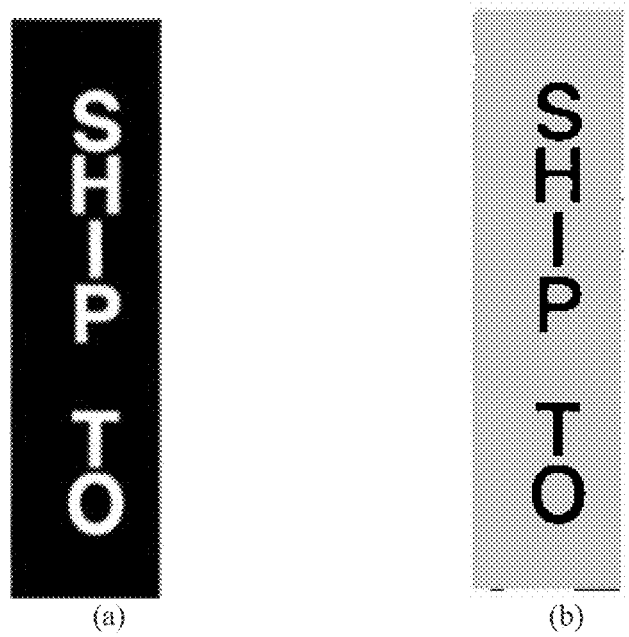
FIG. 16 illustrates a grid that passed the validation based on high density, where (a) is the original grid and (b) is the separated grid and detected cells, where inverse texts are inverted to regular text and the inverse cell is shaded.

FIG. 16 illustrates a grid that passed the validation based on high density, where (a) is the original grid and (b) is the separated grid and detected cells, where inverse texts are inverted to regular text and the inverse cell is shaded.

Figure 17:
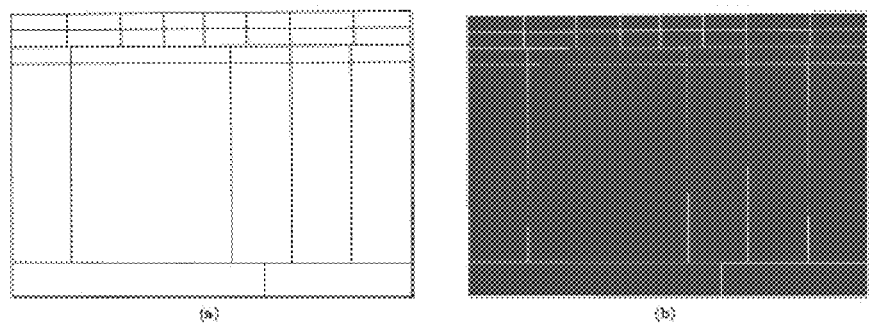
FIG. 17 illustrates a grid that passed the validation based on low density, where (a) is the original grid and (b) is the separated grid and detected cells.

FIG. 17 illustrates a grid that passed the validation based on low density, where (a) is the original grid and (b) is the separated grid and detected cells.

Figure 18:
FIG. 18 illustrates a grid that passed the validation based on border lines, where (a) is the original grid and (b) is the separated grid and detected cells.

FIG. 18 illustrates a grid that passed the validation based on border lines, where (a) is the original grid and (b) is the separated grid and detected cells.

Figure 19:
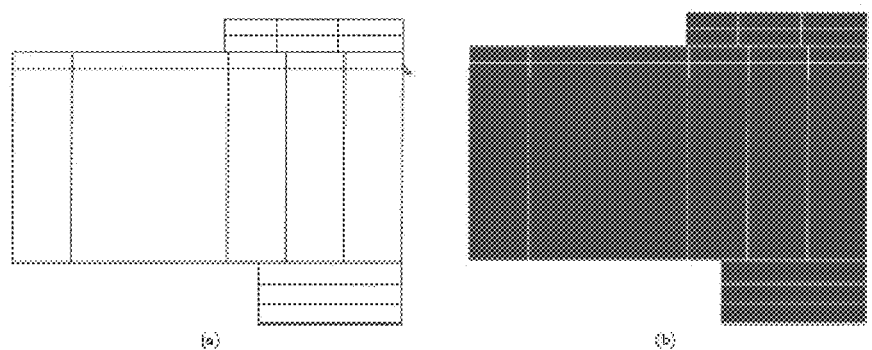
FIG. 19 illustrates a grid that passed the validation based on margins, where (a) is the original grid and (b) is the separated grid and detected cells.

FIG. 19 illustrates a grid that passed the validation based on margins, where (a) is the original grid and (b) is the separated grid and detected cells.

Figure 20:
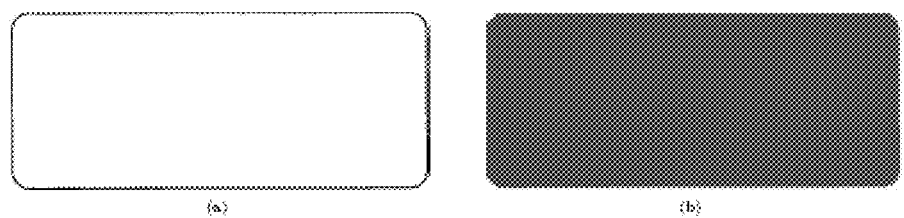
FIG. 20 illustrates a grid that passed the round-corner table validation, where (a) is the original grid and (b) is the separated grid and detected cells.

FIG. 20 illustrates a grid that passed the round-corner table validation, where (a) is the original grid and (b) is the separated grid and detected cells.

Figure 21:
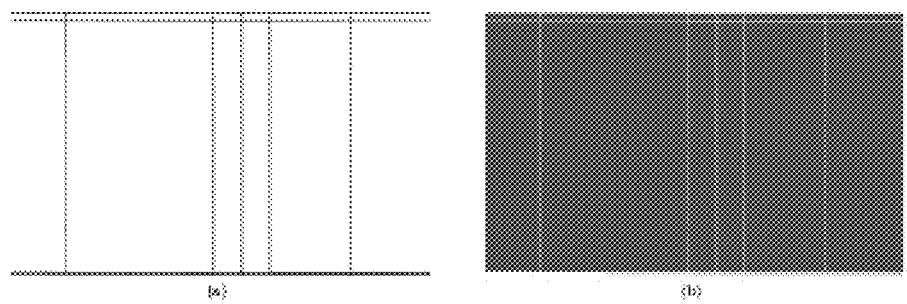
FIG. 21 illustrates a grid that passed the open table validation, where (a) is the original grid and (b) is the separated grid and detected cells.

FIG. 21 illustrates a grid that passed the open table validation, where (a) is the original grid and (b) is the separated grid and detected cells.

Figure 22:
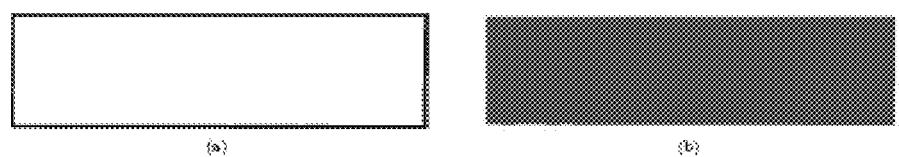
FIG. 22 illustrates a grid that passed the single-cell table validation, where (a) is the original grid and (b) is the separated grid and detected cells.

FIG. 22 illustrates a grid that passed the single-cell table validation, where (a) is the original grid and (b) is the separated grid and detected cells.

VARIOUS EMBODIMENTS

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. As illustrated in FIG. 1, a computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language. When implemented on a general-purpose processor, the program code may combine with the processor to provide a unique apparatus or machine that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for improving image processing in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the image processing using the methods of the present invention.

Although not required, the invention can be implemented via an operating system, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

Those skilled in the art will appreciate that other image processing features besides those specifically described herein may be used with the techniques described herein. Such variations are intended to be included within the scope of the invention as defined by the following claims.

What is claimed:

1. A computer-implemented method for detecting a table grid in a received digital document and extracting the table grid from the received digital document, comprising:
    extracting connected components from the received digital document to identify table grid candidates;
    extracting inverse cells from said table grid candidates;
    extracting grid line components from said table grid candidates;
    validating the grid line components as belonging to a table grid; and
    extracting regular cells from said validated grid line components.

2. The method of claim 1, wherein extracting inverse cells from said table grid candidates comprises generating a binary image from connected components by assigning white background and assigning all pixels in the connected components a black value, and applying a smearing operation to the generated binary image in both horizontal and vertical directions.

3. The method of claim 2, wherein extracting inverse cells from said table grid candidates comprises filling white holes in said connected components that are smaller than a predetermined size with black pixels.

4. The method of claim 3, wherein extracting inverse cells from said table grid candidates comprises removing horizontal and vertical short runs having lengths less than a predetermined threshold by setting pixels in said short runs to white color.

5. The method of claim 4, wherein extracting inverse cells from said table grid candidates comprises removing all black connected components in said binary image and validating whether each connected component may be an inverse cell.

6. The method of claim 5, wherein validating whether each connected component may be an inverse cell comprises for each extracted component with perimeter S, width $w_c$, height $h_c$ and pixel number $N_p$, calculating the rectangularity degree $D_{rect}$ of this connected component as follows:

$$D_{rect} = \min\left(\frac{N_p}{w_c \cdot h_c}, \frac{N_p}{\frac{S - 2\min(w_c, h_c)}{2} \cdot \min(w_c, h_c)}\right),$$

and determining that the connected component is a valid inverse cell component if the rectangularity degree $D_{rect}$ is larger than a predefined threshold.

7. The method of claim 6, wherein validating whether each connected component may be an inverse cell further comprises computing the variance $V_r$ of the lengths of all runs in the connected component as follows:

$$V_r = \begin{cases} \text{var(lengths of all horizontal runs)} & \text{if } w_c < h_c \\ \text{var(lengths of all vertical runs)} & \text{Otherwise} \end{cases}$$

where var(.) is an operator to compute the variance of an integer sequence, and determining that a connected component is an inverse cell component if $V_r$ is less than a threshold.

8. The method of claim 1, wherein extracting grid line components from said table grid candidates comprises determining that any horizontal run or vertical run of pixels in said connected components not smaller than a threshold is part of a table grid.

9. The method of claim 1, wherein validating the grid line components as belonging to a table grid comprises:

determining whether the density D of a connected component is greater than a threshold, where D is the number of pixels in the connected component divided by the product of the width and height of the connected component;

computing the ratio $R_t$ between the number of inverse cell component pixels and the number of the original connected component pixels; and determining that the grid line components belong to a table grid containing inverse cells if $R_t$ is greater than a second threshold.

10. The method of claim 1, wherein validating the grid line components as belonging to a table grid comprises:

determining whether the density D of a connected component is less than a threshold, where D is the number of pixels in the connected component divided by the product of the width and height of the connected component; and determining that the grid line components belong to a table grid if D is less than said threshold.

11. The method of claim 1, wherein validating the grid line components as belonging to a table grid comprises determining whether every line component of the grid line components is long enough and large enough to be part of a table grid based on the width and height of each connected component of the grid line components.

12. The method of claim 1, wherein validating the grid line components as belonging to a table grid comprises:

checking the number of horizontal and vertical grid line components;

when the number is greater than a predetermined number, identifying four margin lines that are two horizontal lines with minimum and maximum Y coordinates and two vertical lines with minimum and maximum X coordinates; and determining that the grid line components are part of a round-corner grid when (1) the sum of the lengths of the four margin lines $S_l$ is greater than or equal to aS, where a is a value between 0 and 1 and S is the perimeter of an original table grid comprising a round-corner rectangle where S is defined as two times the width plus height of the connected components of the original table grid, and (2) the area $A_l$ of the table grid formed by the grid line components is greater than or equal to aA, where A is the area of the original table grid defined as width times the height of the original table grid.

13. The method of claim 1, wherein validating the grid line components as belonging to a table grid comprises:

identifying the two longest horizontal lines and two longest vertical lines of said grid line components with a length tolerance $T_t$;

identifying two horizontal margins as the longest horizontal line with length $L_h$ from horizontal grid line components;

getting all horizontal grid lines with length larger than $L_h-T_t$ and putting them in a group $G_h$;

from $G_h$, taking the line with the minimum Y coordinate as the top margin and the line with the maximum Y coordinate as the bottom margin;

identifying two vertical margins as the longest vertical line with length $L_v$ from vertical grid line components;

getting all vertical grid lines with length larger than $L_v-T_t$ and putting them in a group $G_v$;

from $G_v$, taking the line with the minimum X coordinate as the left margin and the line with the maximum X coordinate as the right margin.

14. The method of claim 13, wherein validating the grid line components as belonging to a table grid comprises:

calculating the distance between the left and right margins, the distance between the top and bottom margins, the position difference between end points of the left and right margins, the position difference between end points of the top and bottom margins, the height difference between the left and right margins, and the width difference between the top and bottom margins; and validating the grid line components if each of the following tests is satisfied:

every pair of margins has the same length;
every pair of margins is at the same level;
there exists at least one thin margin;
the left and right margins are parallel;
the top and bottom margins are parallel; and
the table grid is large enough.

15. The method of claim 13, wherein validating the grid line components as belonging to a table grid comprises:

determining that the table grid comprises an open table defined as a table grid with only top and bottom margins and one or multiple vertical separator lines by:

computing the distance between the top and bottom margins, the position difference between end points of the top and bottom margins, and the width difference between the top and bottom margins; and validating the grid line components if each of the following tests is satisfied:

there exists at least one vertical separator line;
the top and bottom margins have the same length;
the top and bottom margins are at the same level;
both the top and bottom margins are thin margins;
the top and bottom margins are parallel; and
the table grid is large enough.

16. The method of claim 1, wherein validating the grid line components as belonging to a table grid comprises validating a single-cell by:

generating a binary image from the original connected components;

adding a black bounding box to the binary image;

extracting all white holes from the image to get the hole with a maximum area $A_{max}$; and validating the grid line components if the hole with the maximum area has an area that is at least a predetermined percentage of the total area of the original connected components.

17. The method of claim 1, further comprising separating noise, graphics, handwriting, and/or touching text from validated grid line components.

18. A system for detecting a table grid in a received digital document and extracting the table grid from the received digital document, comprising:

a memory that stores a received digital document for processing; and a processor that is programmed to extract connected components from the received digital document to identify table grid candidates, extract inverse cells from said table grid candidates, extract grid line components from said table grid candidates, validate the grid line components as belonging to a table grid, and extract regular cells from said validated grid line components.

19. The system of claim 18, wherein the processor extracts inverse cells from said table grid candidates by generating a binary image from connected components by assigning white background and assigning all pixels in the connected components a black value, and applying a smearing operation to the generated binary image in both horizontal and vertical directions.

20. The system of claim 19, wherein the processor extracts inverse cells from said table grid candidates by filling white holes in said connected components that are smaller than a predetermined size with black pixels.

21. The system of claim 20, wherein the processor extracts inverse cells from said table grid candidates by removing horizontal and vertical short runs having lengths less than a predetermined threshold by setting pixels in said short runs to white color.

22. The system of claim 21, wherein the processor extracts inverse cells from said table grid candidates by removing all black connected components in said binary image and validating whether each connected component may be an inverse cell.

23. The system of claim 22, wherein the processor validates whether each connected component may be an inverse cell by, for each extracted component with perimeter S, width $w_c$, height $h_c$ and pixel number $N_p$, calculating the rectangularity degree $D_{rect}$ of this connected component as follows:

$$D_{rect} = \min\left(\frac{N_p}{w_c \cdot h_c}, \frac{N_p}{\frac{S - 2\min(w_c, h_c)}{2} \cdot \min(w_c, h_c)}\right),$$

and determining that the connected component is a valid inverse cell component if the rectangularity degree $D_{rect}$ is larger than a predefined threshold.

24. The system of claim 23, wherein the processor validates whether each connected component may be an inverse cell by computing the variance $V_r$ of the lengths of all runs in the connected component as follows:

$$V_r = \begin{cases} \text{var(lengths of all horizontal runs)} & \text{if } w_c < h_c \\ \text{var(lengths of all vertical runs)} & \text{Otherwise} \end{cases}$$

where var(.) is an operator to compute the variance of an integer sequence, and determining that a connected component is an inverse cell component if $V_r$ is less than a threshold.

25. The system of claim 18, wherein the processor extracts grid line components from said table grid candidates by determining that any horizontal run or vertical run of pixels in said connected components not smaller than a threshold is part of a table grid.

26. The system of claim 18, wherein the processor validates the grid line components as belonging to a table grid by:
determining whether the density D of a connected component is greater than a threshold, where D is the number of pixels in the connected component divided by the product of the width and height of the connected component;
computing the ratio $R_t$ between the number of inverse cell component pixels and the number of the original connected component pixels; and
determining that the grid line components belong to a table grid containing inverse cells if $R_t$ is greater than a second threshold.

27. The system of claim 18, wherein the processor validates the grid line components as belonging to a table grid by:
determining whether the density D of a connected component is less than a threshold, where D is the number of pixels in the connected component divided by the product of the width and height of the connected component; and
determining that the grid line components belong to a table grid if D is less than said threshold.

28. The system of claim 18, wherein the processor validates the grid line components as belonging to a table grid by determining whether every line component of the grid line components is long enough and large enough to be part of a table grid based on the width and height of each connected component of the grid line components.

29. The system of claim 18, wherein the processor validates the grid line components as belonging to a table grid by:
checking the number of horizontal and vertical grid line components;
when the number is greater than a predetermined number, identifying four margin lines that are two horizontal lines with minimum and maximum Y coordinates and two vertical lines with minimum and maximum X coordinates; and
determining that the grid line components are part of a round-corner grid when (1) the sum of the lengths of the four margin lines $S_l$ is greater than or equal to aS, where a is a value between 0 and 1 and S is the perimeter of an original table grid comprising a round-corner rectangle where S is defined as two times the width plus height of the connected components of the original table grid, and (2) the area $A_l$ of the table grid formed by the grid line components is greater than or equal to aA, where A is the area of the original table grid defined as width times the height of the original table grid.

30. The system of claim 18, wherein the processor validates the grid line components as belonging to a table grid by:
identifying the two longest horizontal lines and two longest vertical lines of said grid line components with a length tolerance $T_t$;
identifying two horizontal margins as the longest horizontal line with length $L_h$ from horizontal grid line components;
getting all horizontal grid lines with length larger than $L_h - T_t$ and putting them in a group $G_h$;
from $G_h$, taking the line with the minimum Y coordinate as the top margin and the line with the maximum Y coordinate as the bottom margin;
identifying two vertical margins as the longest vertical line with length $L_v$ from vertical grid line components;
getting all vertical grid lines with length larger than $L_v - T_t$ and putting them in a group $G_v$; and
from $G_v$, taking the line with the minimum X coordinate as the left margin and the line with the maximum X coordinate as the right margin.

31. The system of claim 30, wherein the processor validates the grid line components as belonging to a table grid by:
calculating the distance between the left and right margins, the distance between the top and bottom margins, the position difference between end points of the left and right margins, the position difference between end points of the top and bottom margins, the height difference between the left and right margins, and the width difference between the top and bottom margins; and
validating the grid line components if each of the following tests is satisfied:
every pair of margins has the same length;
every pair of margins is at the same level;
there exists at least one thin margin;
the left and right margins are parallel;
the top and bottom margins are parallel; and
the table grid is large enough.

32. The system of claim 30, wherein the processor validates the grid line components as belonging to a table grid by:

determining that the table grid comprises an open table defined as a table grid with only top and bottom margins and one or multiple vertical separator lines by:
  computing the distance between the top and bottom margins, the position difference between end points of the top and bottom margins, and the width difference between the top and bottom margins; and
  validating the grid line components if each of the following tests is satisfied:
  there exists at least one vertical separator line;
  the top and bottom margins have the same length;
  the top and bottom margins are at the same level;
  both the top and bottom margins are thin margins;
  the top and bottom margins are parallel; and
  the table grid is large enough.

33. The system of claim 18, wherein the processor validates the grid line components as belonging to a table grid comprises validating a single-cell by:
  generating a binary image from the original connected components;
  adding a black bounding box to the binary image;
  extracting all white holes from the image to get the hole with a maximum area $A_{max}$; and
  validating the grid line components if the hole with the maximum area has an area that is at least a predetermined percentage of the total area of the original connected components.

34. The system of claim 18, wherein the processor further separates noise, graphics, handwriting, and/or touching text from validated grid line components.

35. A computer readable storage medium containing instructions stored thereon that when processed by a processor implements method for detecting a table grid in a received digital document and extracting the table grid from the received digital document by:
  extracting connected components from the received digital document to identify table grid candidates;
  extracting inverse cells from said table grid candidates;
  extracting grid line components from said table grid candidates;
  validating the grid line components as belonging to a table grid; and
  extracting regular cells from said validated grid line components.

36. The medium of claim 35, wherein the instructions for extracting inverse cells from said table grid candidates comprises instructions for generating a binary image from connected components by assigning white background and assigning all pixels in the connected components a black value, and by applying a smearing operation to the generated binary image in both horizontal and vertical directions.

37. The medium of claim 36, wherein the instructions for extracting inverse cells from said table grid candidates comprises instructions for filling white holes in said connected components that are smaller than a predetermined size with black pixels.

38. The medium of claim 37, wherein the instructions for extracting inverse cells from said table grid candidates comprises instructions for removing horizontal and vertical short runs having lengths less than a predetermined threshold by setting pixels in said short runs to white color.

39. The medium of claim 38, wherein the instructions for extracting inverse cells from said table grid candidates comprises instructions for removing all black connected components in said binary image and validating whether each connected component may be an inverse cell.

40. The medium of claim 39, wherein the instructions for validating whether each connected component may be an inverse cell comprises instruction for, for each extracted component with perimeter S, width $w_c$, height $h_c$ and pixel number $N_p$, calculating the rectangularity degree $D_{rect}$ of this connected component as follows:

$$D_{rect} = \min\left(\frac{N_p}{w_c \cdot h_c}, \frac{N_p}{\frac{S - 2\min(w_c, h_c)}{2} \cdot \min(w_c, h_c)}\right),$$

and for determining that the connected component is a valid inverse cell component if the rectangularity degree $D_{rect}$ is larger than a predefined threshold.

41. The medium of claim 40, wherein the instructions for validating whether each connected component may be an inverse cell further comprises instructions for computing the variance $V_r$ of the lengths of all runs in the connected component as follows:

$$V_r = \begin{cases} \text{var(lengths of all horizontal runs)} & \text{if } w_c < h_c \\ \text{var(lengths of all vertical runs)} & \text{Otherwise} \end{cases}$$

where var(.) is an operator to compute the variance of an integer sequence, and for determining that a connected component is an inverse cell component if $V_r$ is less than a threshold.

42. The medium of claim 35, wherein the instructions for extracting grid line components from said table grid candidates comprises instructions for determining that any horizontal run or vertical run of pixels in said connected components not smaller than a threshold is part of a table grid.

43. The medium of claim 35, wherein the instructions for validating the grid line components as belonging to a table grid comprises instructions for:
  determining whether the density D of a connected component is greater than a threshold, where D is the number of pixels in the connected component divided by the product of the width and height of the connected component;
  computing the ratio $R_t$ between the number of inverse cell component pixels and the number of the original connected component pixels; and
  determining that the grid line components belong to a table grid containing inverse cells if $R_t$ is greater than a second threshold.

44. The medium of claim 35, wherein the instructions for validating the grid line components as belonging to a table grid comprises instructions for:
  determining whether the density D of a connected component is less than a threshold, where D is the number of pixels in the connected component divided by the product of the width and height of the connected component; and
  determining that the grid line components belong to a table grid if D is less than said threshold.

45. The medium of claim 35, wherein the instructions for validating the grid line components as belonging to a table grid comprises instructions for determining whether every line component of the grid line components is long enough and large enough to be part of a table grid based on the width and height of each connected component of the grid line components.

46. The medium of claim 35, wherein the instructions for validating the grid line components as belonging to a table grid comprises instructions for:
- checking the number of horizontal and vertical grid line components;
- when the number is greater than a predetermined number, identifying four margin lines that are two horizontal lines with minimum and maximum Y coordinates and two vertical lines with minimum and maximum X coordinates; and
- determining that the grid line components are part of a round-corner grid when (1) the sum of the lengths of the four margin lines $S_l$ is greater than or equal to aS, where a is a value between 0 and 1 and S is the perimeter of an original table grid comprising a round-corner rectangle where S is defined as two times the width plus height of the connected components of the original table grid, and (2) the area $A_l$ of the table grid formed by the grid line components is greater than or equal to aA, where A is the area of the original table grid defined as width times the height of the original table grid.

47. The medium of claim 35, wherein the instructions for validating the grid line components as belonging to a table grid comprises instructions for:
- identifying the two longest horizontal lines and two longest vertical lines of said grid line components with a length tolerance $T_t$;
- identifying two horizontal margins as the longest horizontal line with length $L_h$ from horizontal grid line components;
- getting all horizontal grid lines with length larger than $L_h-T_t$ and putting them in a group $G_h$;
- from $G_h$, taking the line with the minimum Y coordinate as the top margin and the line with the maximum Y coordinate as the bottom margin;
- identifying two vertical margins as the longest vertical line with length $L_v$ from vertical grid line components;
- getting all vertical grid lines with length larger than $L_v-T_t$ and putting them in a group $G_v$; and
- from $G_v$, taking the line with the minimum X coordinate as the left margin and the line with the maximum X coordinate as the right margin.

48. The medium of claim 47, wherein the instructions for validating the grid line components as belonging to a table grid comprises instructions for:
- calculating the distance between the left and right margins, the distance between the top and bottom margins, the position difference between end points of the left and right margins, the position difference between end points of the top and bottom margins, the height difference between the left and right margins, and the width difference between the top and bottom margins; and
- validating the grid line components if each of the following tests is satisfied:
- every pair of margins has the same length;
- every pair of margins is at the same level;
- there exists at least one thin margin;
- the left and right margins are parallel;
- the top and bottom margins are parallel; and
- the table grid is large enough.

49. The medium of claim 47, wherein the instructions for validating the grid line components as belonging to a table grid comprises instructions for:
- determining that the table grid comprises an open table defined as a table grid with only top and bottom margins and one or multiple vertical separator lines by:
- computing the distance between the top and bottom margins, the position difference between end points of the top and bottom margins, and the width difference between the top and bottom margins; and
- validating the grid line components if each of the following tests is satisfied:
- there exists at least one vertical separator line;
- the top and bottom margins have the same length;
- the top and bottom margins are at the same level;
- both the top and bottom margins are thin margins;
- the top and bottom margins are parallel; and
- the table grid is large enough.

50. The medium of claim 35, wherein the instructions for validating the grid line components as belonging to a table grid comprises instructions for validating a single-cell by:
- generating a binary image from the original connected components;
- adding a black bounding box to the binary image;
- extracting all white holes from the image to get the hole with a maximum area $A_{max}$; and
- validating the grid line components if the hole with the maximum area has an area that is at least a predetermined percentage of the total area of the original connected components.

51. The medium of claim 35, further comprising instructions for separating noise, graphics, handwriting, and/or touching text from validated grid line components.

* * * * *